United States Patent [19]
Tuckett et al.

[11] 3,864,103
[45] Feb. 4, 1975

[54] DEHYDRATION OF GASES
[75] Inventors: William F. Tuckett; Ivan A. Peterson, both of Bartlesville, Okla.
[73] Assignee: Phillips Petroleum Company, Bartlesville, Okla.
[22] Filed: May 21, 1973
[21] Appl. No.: 362,238

[52] U.S. Cl. .................................... 55/32
[51] Int. Cl. ........................................ B01d 53/14
[58] Field of Search ................... 55/29–32, 171–177

[56] References Cited
UNITED STATES PATENTS
3,385,575   5/1968   Hall ......................................... 55/32
3,634,998   1/1972   Patterson ................................ 55/32
3,777,456   12/1973  Lund ....................................... 55/32

*Primary Examiner*—Charles N. Hart

[57] ABSTRACT

An improved process for dehydrating a hydrocarbon gas stream, providing more efficient use of desiccant material and greater operating efficiencies by recycling at least a portion of the desiccant material so as to increase the moisture content thereof.

7 Claims, 1 Drawing Figure

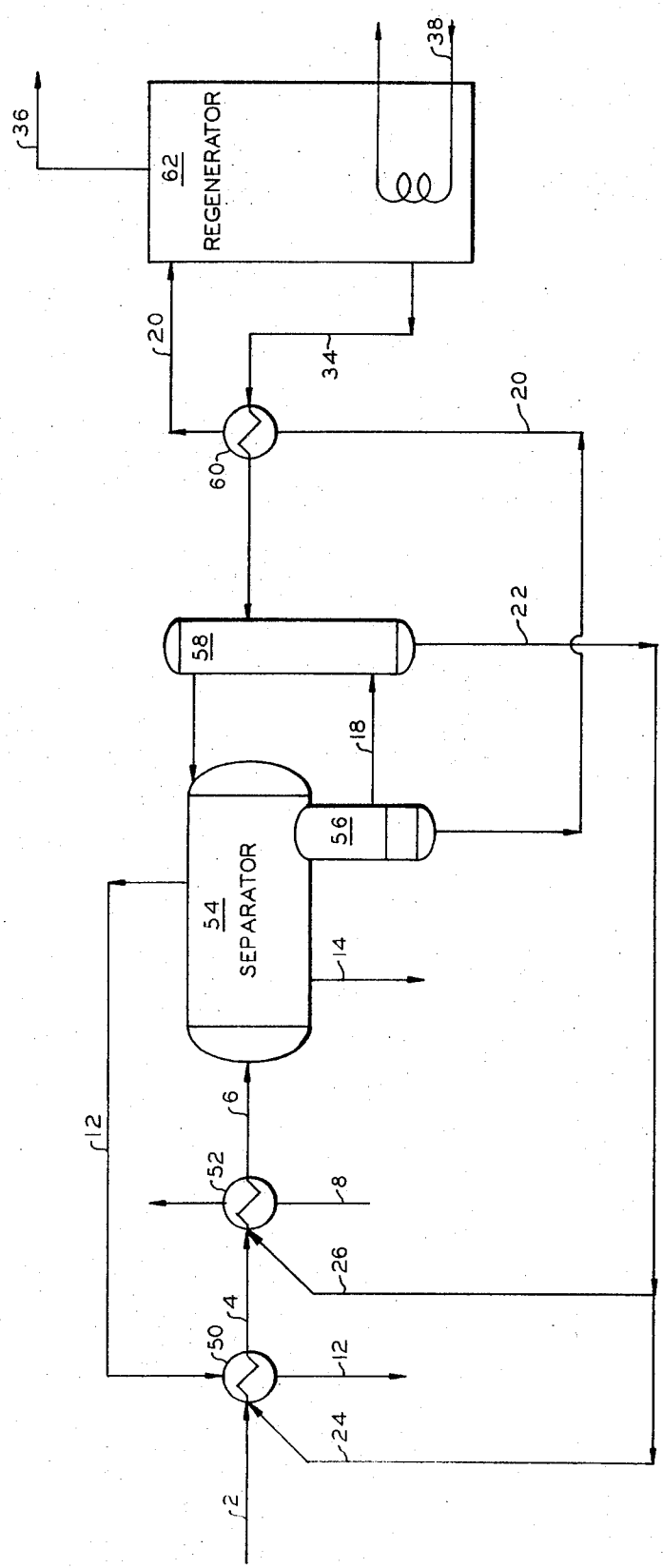

DEHYDRATION OF GASES

This invention relates to the dehydration of gases containing moisture. In one aspect it relates to an improved method of operating a system for dehydration of a gas with a desiccant. In another aspect it relates to a method for the operation of a system for dehydration of a gas with a desiccant glycol.

It is well known to refrigerate gas streams to facilitate separation of the various components in the gas mixtures, e.g., it is common practice to refrigerate natural gas streams, which can contain hydrogen sulfide and carbon dioxide as well as gases such as helium and nitrogen, to a temperature low enough to condense essentially all of the heavier hydrocarbons such as propane and heavier which are contained therein. The liquefied hydrocarbons are then easily separated from the gaseous residue consisting essentially of methane together with ethane. If desired, the gas stream can be cooled to a temperature sufficient to condense some or all of the ethane or to condense all but extraneous substances such as nitrogen and helium. One problem in reducing the temperature of natural gas streams much below 32°F is the condensation of water vapor usually contained therein, with resultant freezing thereof to form ice crystals and/or hydrate crystals of hydrocarbons, hydrogen sulfide, and carbon dioxide. These crystals can be formed at temperatures above 32°F and sometimes as high as 58°F. Such solid crystals plug the heat exchange area in the chilling or cooling system and related piping and make operation of the plant impossible after a very short time. Carbon dioxide and hydrogen sulfide, if present in the gas, will also freeze out of the gas if it is cooled to sufficiently low temperature.

The formation of such solid deposits in natural gas low temperature processing plants has been alleviated in the past by removing as much of the hydrogen sulfide, carbon dioxide and water as possible before the natural gas feedstock is cooled below the temperature at which said solids begin to form. One method which has been employed for accomplishing this comprises contacting the gas with high-boiling (low vapor pressure) liquid desiccants, e.g., ethylene glycol, diethylene glycol, triethylene glycol, and mixtures thereof, to absorb the water and thereby dry the gas. High-boiling desiccants are used in such processes so as to minimize introduction of the desiccant into the dried gas stream by evaporation. Such processes have the disadvantage of high operating costs. Due to the large flow rates of liquid absorbent required to achieve the proper amount of contact, such processes have required large and expensive contacting equipment together with large and expensive equipment associated with recovery of the desiccant.

It is therefore an object of this invention to provide an improved process for drying a moisture-containing gas stream.

Another object is to provide a drying method which requires substantially less equipment for handling and processing the desiccant stream.

Other objects, aspects, and advantages of the present invention will become apparent from the disclosure, the appended claims and the drawing.

By the present invention there is provided a process for dehydrating a hydrocarbon gas stream with a liquid desiccant which requries substantially less and smaller equipment than systems heretofore known. There is provided a process for dehydrating a hydrocarbon gas stream wherein the gas stream is intimately contacted with a liquid desiccant containing previously absorbed moisture in a contacting zone. This gas and liquid mixture is then chilled to a temperature sufficient to condense the high boiling constituents of the hydrocarbon gas stream. At the same time, moisture is absorbed by the desiccant. The resultant chilled mixture is separated by passage through a separator into a gaseous component, now containing low boiling gaseous constituents, a first liquid stream containing high boiling gaseous constituents and a second liquid stream containing desiccant and absorbed moisture. A major portion of this second stream is recycled to the contact zone. A small amount of the desiccant-containing moisture stream is withdrawn and passed to a regeneration zone wherein most of the absorbed moisture is removed. The lean desiccant is then passed to the recycle loop wherein it is mixed with the recycling desiccant.

The drawing is a diagrammatic view of a portion of a typical natural gas-liquids recovery plant. The drawing shows a gas stream, a plurality of gas-stream temperature-lowering zones, and associated equipment for preventing hydrate and ice formation in the gas stream.

Referring now to the drawing, the gaseous feed stream, e.g., a natural gas stream, enters the system through line 2 then passes through at least one cooling stage 50 wherein the gas temperature is lowered to a preselected temperature. In those instances where the gaseous feed stream is at a temperature and pressure and contains hydrate-forming constituents in an amount at least sufficient to cause formation of gas hydrates, a desiccant from line 24 is sprayed onto the cooling surface area of cooling stage 50 in an amount sufficient to completely wet the cooling surface area. The cooled gas stream containing desiccant is passed through line 4 to at least one further chiller 52 wherein the gas temperature is lowered to a temperature sufficient to liquefy at least some of the ethane and substantially all of the propane and heavier components of the gas. Desiccant from line 26 is sprayed onto the cooling surface area of chiller 52. It is an essential feature of this invention that the desiccant material be added at any stage where the lowered temperature can cause hydrates to form.

The chilled gas, now containing a desiccant material, is passed from final chiller 52 through line 6 to a vapor-liquid separator 54 where the desiccant is separated into a heavier liquid phase which collects in desiccant leg 56 and the lower portion of separator 54. The separated light gaseous hydrocarbons are withdrawn from separator 54 and passed via line 12 to further processing which is not shown and which does not form a part of this invention. The separated liquid hydrocarbons, which float as a layer on the desiccant layer, are withdrawn from separator 54 and passed via line 14 to a fractionation system, also not shown. If desired the light hydrocarbon fractions flowing through line 12 can be passed through cooling stage 50 to assist in cooling the incoming gas.

A major portion of the separated desiccant is withdrawn from the desiccant leg 56 and passed to the desiccant mixing chamber 58 via line 18. Desiccant is withdrawn from the desiccant mixing chamber 58 and passed, via line 22, to lines 24 and 26 for introduction into cooling stage 50 and/or chiller 52.

A lesser portion of the separated desiccant is withdrawn from desiccant leg 56 and passed via line 20 through heat exchanger 60 thence to a desiccant regenerator 62 which can be a typical fractionator or stripper. Heat is added to regenerator 62 by means 38 for separating water from the desiccant. Water vapor is withdrawn from regenerator 62 through line 36. Lean desiccant is withdrawn from regenerator 62 and passed by line 34 through heat exchanger 60 for imparting heat to the rich desiccant entering the stripper and for cooling the stripped desiccant, thence to the desiccant mixing chamber 58.

Auxiliary equipment such as valves, pressure and temperature indicating, recording and control equipment, flow indicating, recording and control equipment and the like are not disclosed nor described for purposes of brevity. The need for such auxiliary equipment, its installation and use are well understood by those skilled in the art.

Suitable desiccants for use in this invention include liquid desiccants such as ethylene glycol, diethylene glycol, triethylene glycol, or mixtures thereof. Certain alcohols such as normal butyl alcohol, isobutyl alcohol, methylcarbitol and the like can also be used as desiccant in our system.

One requirement of a desiccant obviously is that it must be relatively inert to the gas being treated. Likewise, the desiccant preferably should be noncorrosive to conventional equipment so that special chemically resistant equipment need not be used.

The desiccant containing absorbed moisture being recycled through line 22 can be recycled until it contains from about 25 to about 75 weight percent absorbed moisture. A now preferred range of absorbed moisture is from about 40 to about 60 weight percent. The resulting desiccant-water solution must have a freezing point below the minimum temperature of chiller 22.

The moisture content of the regenerated desiccant can be in the range of from about 1 to about 20 weight percent.

The desiccant regeneration system can be any means known in the art for removing moisture from a desiccant. For example, the regenerator can be a simple distillation unit wherein the rich desiccant is heated to drive off the absorbed moisture.

The following example, utilizing the apparatus shown in the drawing, illustrates the present invention.

Typical Operation

|  | With Invention | Without[3] Invention |
|---|---|---|
| Stream 2 - feed gas to plant, natural gas, MMSCFD | 1018 | 1018 |
| Stream 22 - recycle desiccant, ethylene glycol | | |
| flow rate, GPM[1] | 64 | 64 |
| concentration[2] | 53% | 70% |
| temperature | 10°F | 110°F |
| Stream 18 - rich desiccant from separator 23 | | |
| flow rate, gpm | 59.4 | not used |
| concentration | 50% | |
| Stream 20 - rich desiccant to regenerator | | |
| flow rate, gpm | 9.2 | 68.4 |
| concentration | 50% | 66% |
| Stream 34 - regenerated desiccant | | |
| flow rate, gpm | 4.6 | 64 |
| concentration | 90% | 70% |
| Stream 36 | | |
| moisture removed, lbs/min | 39.4 | 39.4 |

Typical Operation-Continued

|  | With Invention | Without[3] Invention |
|---|---|---|
| Regenerator reboiler duty, MMBtu/hr | 3.59 | 6.64 |
| Regenerated desiccant, heat load to be removed MMBtu/hr | 0.25 | 2.61 |
| Pumping horsepower required (hydraulic horsepower) | 10 | 52.3 |

[1] gallons per minute
[2] weight percent glycol in the desiccant stream
[3] prior practice, without invention, is to run all of the liquid desiccant phase recovered in separator 54 through regenerator 62.

From the above data, it can be seen that the present invention provides an improved process in terms of desiccant regenerator size, heat and cooling requirements, and associated circulating equipment with no sacrifice in terms of moisture removed from the gas stream.

The process of this invention is applicable to the dehydration of any gas containing moisture. While we have illustrated our process for the dehydration of natural gas, it is obvious that the process is equally applicable for the dehydration of other gases, such as manufactured or synthetic gas, or a cracked gas resulting from an operation for the production of ethylene. In addition to natural and synthetic gases, the process can be used for dehydrating such other gases as hydrogen, nitrogen, carbon dioxide, air or any other gas which needs to be dehydrated and which is chemically nonreactive with the dehydrating agent.

Various modifications or embodiments of the invention will be apparent to those skilled in the art in view of this disclosure. Such modifications or embodiments are within the spirit and scope of the disclosure.

We claim:

1. In a process for dehydrating a hydrocarbon gas stream containing moisture, wherein said gas is contacted in a contacting zone with a liquid desiccant and the resulting mixture is thereafter chilled to a temperature sufficient to condense the high boiling constituents of said hydrocarbon gas stream, then separated into a gaseous component containing low boiling gaseous constituents, a first liquid stream containing high boiling gaseous components and a second liquid stream containing said desiccant and absorbed moisture, wherein said desiccant containing moisture stream is regenerated to remove absorbed moisture, the improvement which comprises recycling a major portion of said separated desiccant containing moisture so as to increase the moisture content thereof, passing a lesser portion of said separated desiccant containing moisture stream to a regeneration zone wherein most of said absorbed moisture is removed and admixing the thus-regenerated desiccant with said recycling desiccant containing moisture stream, which resulting admixture is thereafter introduced to said contacting zone.

2. A process according to claim 1 wherein said separated desiccant containing moisture is recycled until it contains from about 40 to about 60 weight percent water.

3. A process according to claim 1 wherein said desiccant is selected from the group consisting of glycol, glycol ethers and alcohol.

4. A process according to claim 3 wherein said desiccant is ethylene glycol.

5. A process according to claim 3 wherein said desiccant is diethylene glycol.

6. A process according to claim 1 wherein said moisture-containing hydrocarbon stream is natural gas.

7. A process according to claim 1 wherein said moisture-containing hydrocarbon stream is a manufactured gas.

* * * * *